United States Patent [19]

Collins et al.

[11] 4,277,826

[45] Jul. 7, 1981

[54] SYNCHRONIZING MECHANISM FOR PAGE REPLACEMENT CONTROL

[76] Inventors: Robert W. Collins, 2404 NW. 4 Ave., Rochester, Minn. 55901; Roy L. Hoffman, Rte. #2, Pine Island, Minn. 55963; Larry W. Loen, 2203 NW. 17 Ave., Rochester, Minn. 55901; Glen R. Mitchell, Rte. #1, Pine Island, Minn. 55963; Frank G. Soltis, 2804 Mayowood Hills Dr. SW, Rochester, Minn. 55901

[21] Appl. No.: 954,034

[22] Filed: Oct. 23, 1978

[51] Int. Cl.³ .............................................. G06F 3/00
[52] U.S. Cl. ................................................. 364/200
[58] Field of Search ... 364/200 MS File, 900 MS File

[56] References Cited

U.S. PATENT DOCUMENTS

| 3,693,165 | 9/1972 | Reiley et al. | 364/200 |
|---|---|---|---|
| 3,737,881 | 6/1973 | Cordi et al. | 364/900 |
| 3,761,881 | 9/1973 | Anderson et al. | 340/172.5 |
| 3,786,427 | 1/1974 | Schmidt et al. | 364/200 |
| 3,839,706 | 10/1974 | Borchsenius | 364/200 |
| 3,854,126 | 12/1974 | Gray et al. | 364/200 |
| 3,938,100 | 2/1976 | Steiner | 364/200 |
| 3,979,726 | 9/1976 | Lange et al. | 364/200 |
| 4,035,778 | 7/1977 | Ghanem | 364/200 |
| 4,037,209 | 7/1977 | Nakajima et al. | 364/200 |
| 4,053,948 | 10/1977 | Hogan et al. | 364/200 |
| 4,054,945 | 10/1977 | Ichiko et al. | 364/200 |
| 4,084,230 | 4/1978 | Matick | 364/200 |
| 4,173,783 | 11/1979 | Couleur et al. | 364/200 |

FOREIGN PATENT DOCUMENTS 2227882 of 0000 Fed. Rep. of Germany.
2629311 of 0000 Fed. Rep. of Germany.
1487078 11/1973 United Kingdom.

OTHER PUBLICATIONS

Boggs, Jr.; "Minimizing Input/Output Page Pinning in a Virtual Storage Data Processor"; IBM Tech. Disc. Bull. vol. 19, No. 1; Jun. 1976.
Moore, B; "Channel Dat Synchronization"; IBM Tech. Discl. Bull.; vol. 20, No. 6; Nov. 1977.
Morris, R.; "Scatter Storage Techniques"; CACM; vol. 11, No. 1; pp. 37-44; Jan. 1968.
Schneier, C.; "Table Update Serialization Technique"; IBM Tech. Discl. Bull.; vol. 21, No. 3; Aug. 1978.

Primary Examiner—Errol A. Krass
Attorney, Agent, or Firm—Dorsey, Windhorst, Hannaford, Whitney & Halladay

[57] ABSTRACT

An apparatus provides synchronization for page replacement control in a paged, virtual memory environment in which either the CPU or the I/O devices may pin and unpin pages to control their replacement by the paging supervisor. Pinning and unpinning of pages by the I/O devices occurs independently of pinning and unpinning performed by the CPU. Synchronization is achieved by means of a virtual address translation mechanism which is common to the CPU and the I/O devices. The virtual address translation mechanism includes a primary directory having entries for each page in main storage, with each entry containing a field in which the pinning and unpinning operations by the CPU and the I/O devices are registered. In particular, this field is a counter which is incremented when a page is pinned by either the CPU or an I/O device and decremented when a page is unpinned.

Each page directory entry also includes a field for indicating that references to the page corresponding to a given page directory entry are invalid. When it is determined that a particular page is no longer in use and is eligible for replacement, the page directory entry is set to indicate that further references to the page are invalid. When an I/O device gives up a buffer page, that page is unpinned. Buffer pages newly acquired by the I/O device are pinned when they are acquired by the device and have become available in main storage.

13 Claims, 4 Drawing Figures

SYNCHRONIZING MECHANISM FOR PAGE REPLACEMENT CONTROL

BACKGROUND OF THE INVENTION

1. Field of the Invention

This invention relates to data processing systems employing virtual memory partitioned into pages, and, more specifically, to synchronizing apparatus for page replacement control where the central processing unit (CPU) and the input-output (I/O) devices share a common address translation mechanism, including a primary page directory.

2. Description of the Prior Art

In a computer system employing virtual memory, any reference to data or instructions which do not reside in main storage causes a fixed size block of data or instructions (called a page) to be moved from the secondary storage into the main storage. In order to make room for the new page in main storage, some other page may have to be moved back to the secondary storage. The algorithm used to select which page is moved back is called the replacement algorithm. Typically, a "least-recently-used" algorithm is used to govern movement of pages from main to secondary storage. That is, pages which have not recently been referenced are replaced first. Although the present discussion only concerns page movement between two storage levels, main and secondary storage, the basic concept of the invention is applicable to storage hierarchies with several levels (e.g., cache, main storage, disk, library). In such multi-level systems, if a page is not used for an extended period of time, it will migrate through the storage hierarchy to the slowest level.

The least-recently-used algorithm is acceptable for most paging situations. The most recently used data is contained in high-speed, main storage ready for immediate access, while less frequently used data resides in secondary, slower speed storage. Situations arise, however, in which certain data and instructions on certain pages must be available for immediate access in main storage independent of the usage history of the pages. Access to these pages may be required as a result of a reference made by either the CPU or by an I/O device. For example, data buffers for certain high speed I/O devices must be located in main storage. If part of a buffer must be fetched from slower speed storage after a data transfer has been started, the result could be to "overrun" the device, by a failure to provide the necessary buffer in time for part of the data transfer. As a second example, representative of a CPU requirement rather than an I/O device requirement, certain routines, called deadline-time processing routines, must execute within a set period of time in order to avoid some catastrophic result. Process control operations are typical of this type or routine. For these routines, the delay caused by fetching a page from secondary storage can be intolerable. In still other cases, it is desirable from either a performance or functional viewpoint to have certain high priority instruction routines or data always available in main storage.

There are several known techniques for insuring the presence of or "pinning" a page of data or instructions in main storage. The usual technique used to accomplish this is to reserve an area in main storage for those pages which cannot be permitted to migrate to secondary storage. Any attempt to replace a page pinned in this reserved storage is blocked. This approach works well as long as the reserved area is neither large nor has a dynamically changing size requirement. In a multi-tasking environment with a large number of tasks, the pages which must be pinned in main storage change, depending upon which tasks are executing. To provide an area large enough to contain all of the pages for all of the tasks would soon consume the entire main storage. Thus, some mechanism is needed to dynamically control which pages are to be pinned and to identify when a page can be unpinned. One arrangement for dynamic control of pinning and unpinning of pages which appears in the prior art is found in "Minimizing Input-/Output Page Pinning In a Virtual Storage Data Processor" by J. K. Boggs, Jr., in IBM Technical Disclosure Bulletin Vol. 19, No. 1, June 1976.

This arrangement employs special virtual address translation hardware for each I/O channel and permits each I/O channel to pin only, while unpinning must be performed by the operating system. Accordingly, cost and efficiency disadvantages may be present in some applications. Another arrangement, described in U.S. Pat. No. 3,839,706 issued to Borchsenius, permits the I/O channel to both pin and unpin pages. In this arrangement a special channel look-aside buffer is used, and the zero/non-zero status of a page use counter is transmitted to memory to notify the CPU of the pinning. Extra channel hardware is required, and address translation means are duplicated. Arrangements allowing a CPU to pin and unpin pages are also known; however, the known arrangements operate in an environment in which page pinning by I/O devices does not occur.

SUMMARY OF THE INVENTION

The present invention provides an arrangement whereby both the CPU and the I/O devices can pin and unpin pages dynamically, by means of common hardware and shared information in main storage. In particular, the present invention constitutes an improvement in a virtual memory computer system having main storage, a CPU and I/O devices connected to the main storage and the central processing unit. The improvement comprises virtual memory address translation means for translating virtual memory addresses received from the CPU and the I/O device into main storage addresses. The translation means includes a page directory having entries corresponding to pages in main storage, which entries contain a field for indicating page usage. Means operable under the control of either the CPU or the I/O devices set the field for indicating page usage.

A principal object of the invention is to provide an apparatus for synchronizing the pinning and unpinning of pages by the CPU and I/O devices.

Another object of the invention is to provide such a synchronizing apparatus by means of a common virtual address translation mechanism.

BRIEF DESCRIPTION OF THE DRAWINGS

In the accompanying drawings forming a material part of this disclosure.

DESCRIPTION OF THE INVENTION

General Description of Operation

Figure 1:
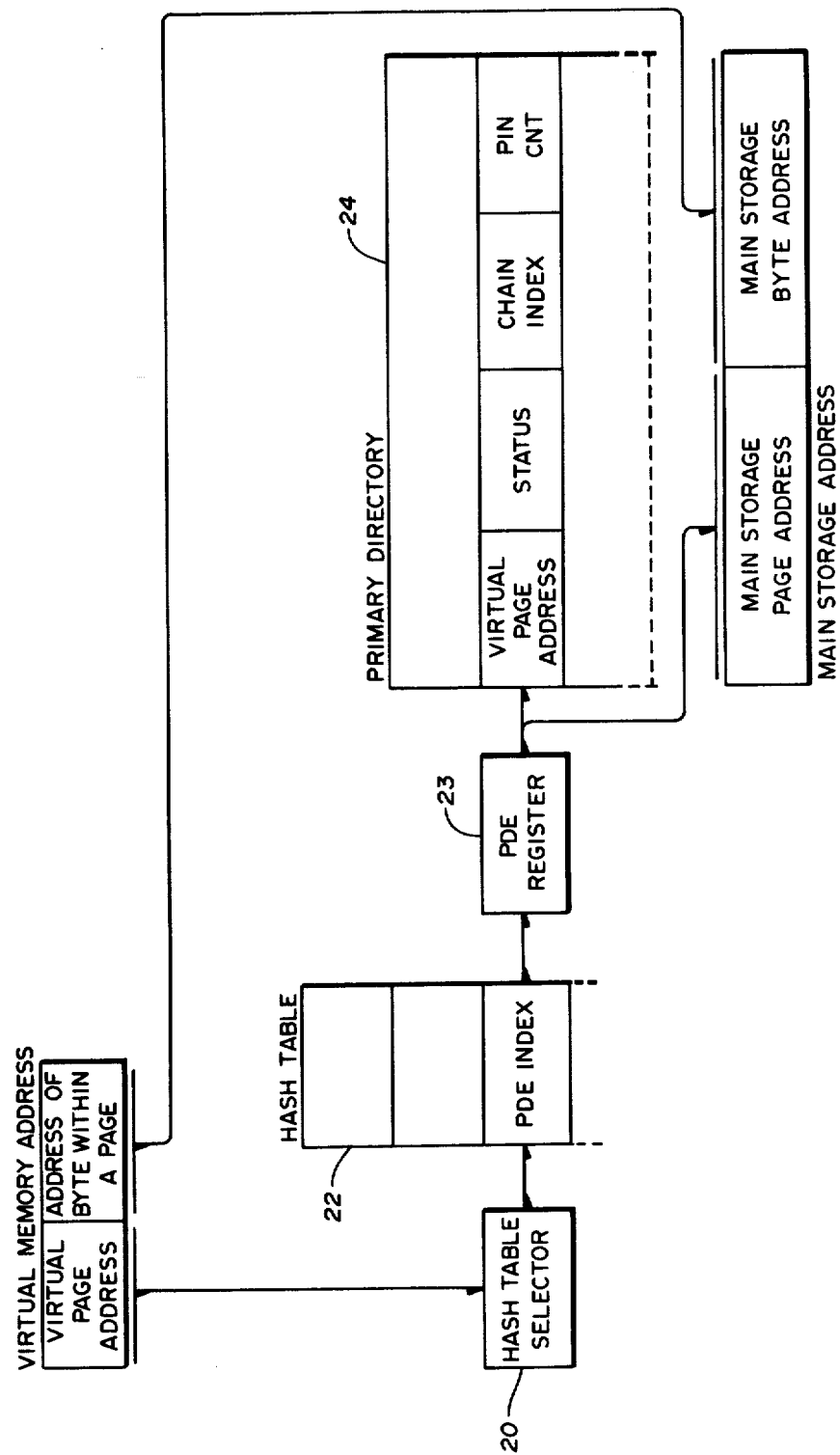
FIG. 1 is a function block and flow diagram showing the process and apparatus used for virtual address translation with the present invention, including the format of a primary directory entry.

FIG. 1 shows the address translation mechanism which transforms a virtual memory address, consisting of a virtual page address portion and the address of a byte within a page, into the real address of a page in main storage. As seen in FIG. 1, a hash table selector 20, a hash table 22, a primary directory entry (PDE) register 23 and a primary directory 24 are used to translate from the virtual memory page address to the main storage page address. The address of a particular byte within a page can be used directly, without translation.

The hash table selector 20 uses the virtual page portion of the virtual memory address to select an entry in the hash table 22. While a variety of more or less complex hashing (or address compression) algorithms are available, a simple form of hashing which can be used by the hash table selector 20 is to select certain bits from the virtual memory address to form an index into the hash table 22. More complex hashing schemes having certain advantages are known, but their description is not relevant to the present invention. Each hash table entry contains a bit indicating whether the entry also contains a valid index into the primary directory. If such a valid index is present, it is used in the PDE register 23 to point to an entry in the primary directory 24. Accordingly, two indexes are used to locate a primary directory entry. The first, or hash, index points into the hash table 22. The second, or PDE index, is an entry in the hash table 22 which is used in the PDE register 23 to point to a primary directory entry.

Each entry in the primary directory is associated with a single real page (or frame) in main storage. The first primary directory entry corresponds to the first page in main storage, the second entry to the second page, and so forth, for all the pages in main storage. Each primary directory entry contains the virtual memory page address of the associated main storage page, along with status information about the page. FIG. 1 shows the field format of a primary directory entry. Each primary directory entry contains the following fields:

VIRTUAL PAGE ADDRESS—This field contains the page portion of the virtual address of the page in main storage associated with this entry.

STATUS—This field provides status information about the page as follows:

Valid bit—The page described by this entry is/is not available for access. When this bit is a 1, the page is available and address translation proceeds. When this bit is a 0, the page is unavailable, address translation stops and an address translation exception is signalled. That is, the same exception is raised as when the entry for the desired virtual address is not found.

Reference bit—The page has/has not been referenced.

Change bit—The page has/has not been changed.

CHAIN INDEX—This field provides a pointer to the next primary directory entry in a chain of entries.

PINCNT—This field contains a one-byte counter for pinning pages in main storage. A non-zero value indicates that the page is in use (pinned) and should not be removed from main storage.

After the address translation process has led to selection of a primary directory entry, the page portion of the virtual address to be translated is compared to the virtual page address found in the entry. If they match and the Valid bit of the STATUS field is on, the (real) main storage address is generated based on the ordered association of each primary directory entry with a single page in main storage. If they match and the Valid bit of the STATUS field is off, an address translation exception is signalled. If they do not match, the CHAIN INDEX field in the entry is used to address the next primary directory entry in a chain of entries. This process is continued until either a match is found or a bit in the CHAIN INDEX field indicates the end of the chain. No match found upon reaching the end of the chain means the page is not presently in main storage and must be fetched from secondary storage.

When it becomes necessary to replace a page in main storage, the Reference and Change bits of the STATUS field, along with the PINCNT field, are referred to. The Reference and Change bits are used by a page replacement algorithm in the paging supervisor to identify a page to be replaced. The page identified can only be replaced if the PINCNT field contains a zero value, i.e., the PINCNT field value indicates the page is not pinned. If the PINCNT field is non-zero, the page is pinned and the replacement algorithm must select another page to be replaced. Once it has been determined that the identified page has a zero in the PINCNT field, the replacement algorithm must immediately set the Valid bit in the primary directory entry for this page to a 0, indicating an invalid page, not available for access. This action causes an address translation exception to be signalled if any further use of this page is attempted. In fact, testing for a zero in the PINCNT field and making the directory entry invalid must occur as a single, atomic operation in order to prevent some other task or I/O device from interrupting and setting the PINCNT field after it has been tested for zero, but before the entry has been invalidated. The invalid state is required to keep pages unavailable during transfer to and from secondary storage. System integrity requires the pages to be unavailable, as the contents may appear inaccurate to the CPU during transfer.

The PINCNT field is implemented as a counter to allow more than one task or I/O device to pin the same page. A task or I/O device wishing to pin a page simply increments the counter by one. When a task or I/O device unpins a page, the counter is decremented by one. Thus, any count greater than one indicates more than one user of the page. Also, one task or I/O device unpinning a page does not automatically make the page replaceable if some other task also has it pinned.

Before a page can be pinned, it is necessary to insure that it is in main storage. Again, the check of whether or not the page is in main storage and the incrementing of the PINCNT field must occur as a single, atomic operation in order to prevent some other task or I/O device from interrupting and causing the page to be replaced before it can be pinned.

For the CPU, two special instructions are used to accomplish the pinning/unpinning operations and the invalidating of a primary directory entry. These instructions, together with the primary directory, allow any task in the system to control the page replacement function without having knowledge of the actions of any other task or I/O device. This synchronization mechanism is especially important when I/O devices independently pin or unpin pages in main storage for use as data buffers. In addition to the two instructions, which are, of course, available only to the CPU, a mechanism is provided for the I/O devices to share the hardware and primary directory used by these instructions so that pinning and unpinning by I/O devices can be synchronized with these operations as performed by the CPU.

The two instructions, which may be referred to as Hash and Verify Virtual Address (HVVA) and Invalidate Primary Directory Entry (IPDE) are defined as follows. To provide specific examples, instructions comprising a particular number of bits, as identified by the numbers below the various fields, are shown.

HASH AND VERIFY VIRTUAL ADDRESS
(HVVA) INSTRUCTION

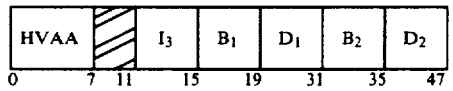

When the instruction is executed, the virtual page address at the second-operand location, specified in bits 32–47 by a base register (B₂) and displacement (D₂), undergoes translation. That is, the address is hashed, and the presence of a primary directory entry corresponding to the second operand is determined. When no primary directory index exists, execution of the instruction is interrupted in order to fetch the page from secondary storage. The first operand location, specified in bits 16–31 by a base register (B₁) and a displacement (D₁), is set to contain the hash table entry index and, if a primary directory entry is present, the PDE index value found in the hash table. In addition, if the matching primary directory entry found is valid (the Valid bit in the STATUS field is a 1), the third operand, specified in bits 12–15 (I₃) is used to determine whether or not the pin count (PINCNT) field in the primary directory entry is to be incremented or decremented by one.

The first operand occupies a word (4 bytes) in storage. The initial value of the first operand is not relevant. After the execution of the HVVA instruction, bits 0–14 of this word in storage contain the hash table entry index value; bit 15 is zero; bits 16–27 contain the index to the primary directory entry, if present; and bits 28–31 are zero. If the primary directory entry is not present, bits 16–31 are unchanged.

The bit positions of the I₃ field, used to specify the changes, if any, made to the PINCNT field, are defined as follows:

| BIT | DEFINITION |
|---|---|
| 12 | Pin count modification |
| | 0 Pin count not to be modified |
| | 1 Pin count to be incremented or decremented |
| 13 | Increment/Decrement pin count |
| | 0 Increment pin count by one |
| | 1 Decrement pin count by one |
| 14 | Not used |
| 15 | Not used |

If the pin count is incremented beyond 255 or below zero, a machine check occurs.

The condition codes resulting from the execution of the HVVA instruction are as follows. The codes indicate to the system various different outcomes from executing the instruction.

0—Primary directory entry exists and is valid.
1—Primary directory entry exists and is invalid.
2—Primary directory entry does not exist.
3—Not used.

INVALIDATE PRIMARY DIRECTORY ENTRY
(IPDE) INSTRUCTION

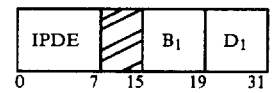

The PINCNT field in the primary directory entry, identified by the first operand, specified in bits 16–31 by a base register (B₁) and displacement (D₁), is compared to zero. If it is equal to zero, the Valid bit is set to zero. If the PINCNT field is not equal to zero, the primary directory entry is not changed.

The first operand occupies two bytes in storage. Bits 0–11 of this operand are used as the primary directory index value to locate the primary directory entry to be invalidated. If the index value specifies a primary directory entry beyond the range of primary directory entries, a specification exception is recognized and the operation is suppressed.

The condition codes resulting from the execution of the IPDE instruction are as follows. The codes indicate to the system various different outcomes from executing the instruction.

0—Primary directory entry invalidated, pin count equals zero.
1—Primary directory entry not invalidated, pin count not zero.
2—Not used.
3—Not used.

Description of Implementation

Figure 2:
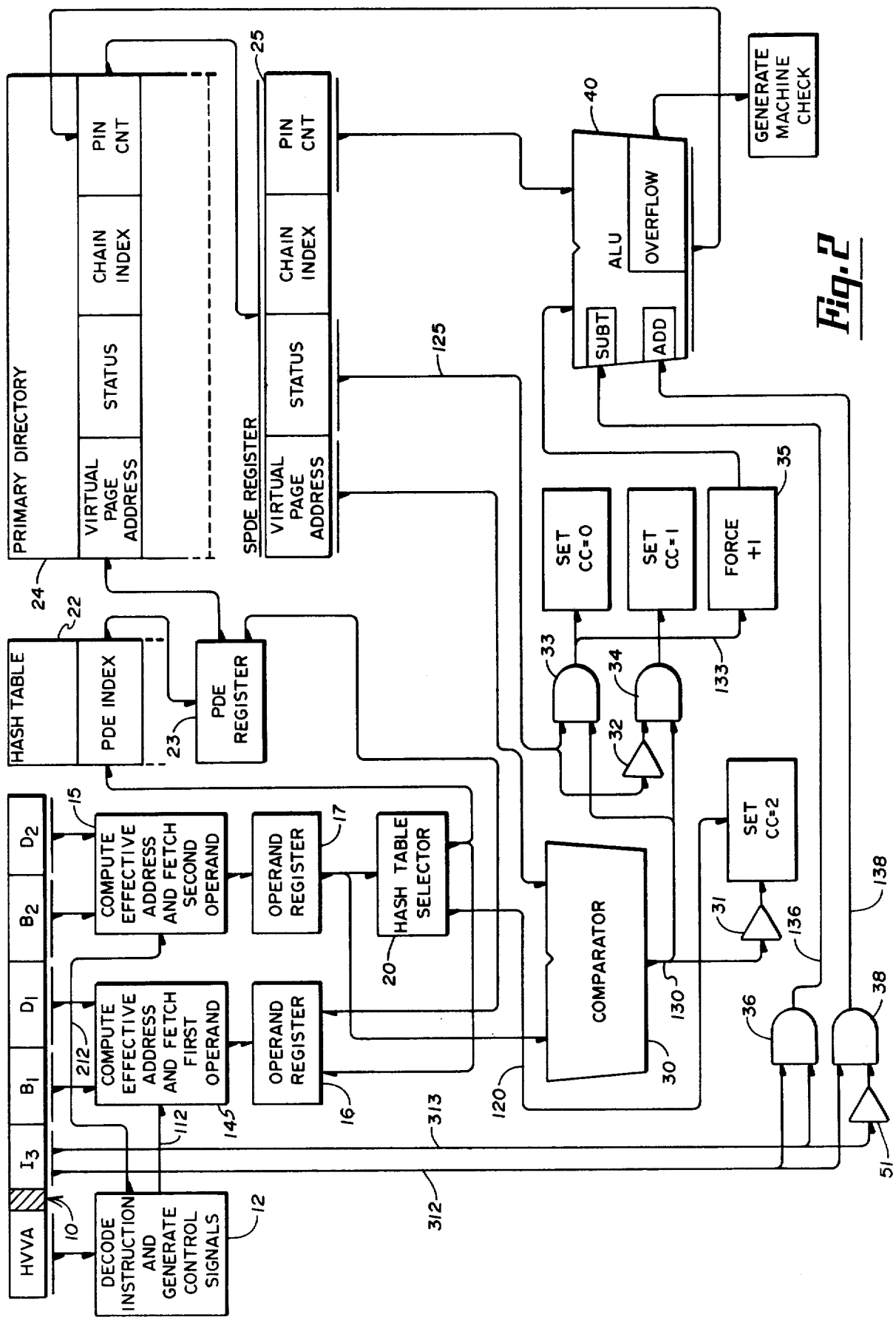
FIG. 2 is a function block and flow diagram showing execution of the HVVA instruction, implementing a part of the present invention.

An implementation of the HVVA instruction illustrating how the pin count field (PINCNT) is incremented or decremented is shown in FIG. 2. Upon detecting that the instruction contained in the instruction buffer 10 is a HVVA instruction, the instruction decoding hardware 12 next generates control signals, indicated symbolically by the lines 112 and 212, which cause the two operands to be fetched from main storage in accordance with the base register and displacements specified in the instruction. This calculation of an effective address is shown schematically in blocks 14 (first operand) and 15 (second operand). The effective addresses for the operands are computed in the conventional way by adding the displacements D₁ and D₂ from the instruction buffer 10 to the contents of the base registers identified by the B₁ and B₂ fields. These effective addresses are then used to fetch the two operands from main storage (not shown) into first and second operand registers, 16 and 17, respectively. The second operand register 17 now contains the virtual address to be hashed. The hash table selector 20 uses certain bits from the virtual address contained in the second register 17 to generate a number called the hash table index. This index is used to select an entry in the hash table 22, which contains PDE indices and is located in main storage in the preferred embodiment. Due to the nature of hashing, some entries in the hash table 22 will not contain a PDE index. This lack of an index entry is indicated by a bit in the hash table entry, which is tested by the hash table selector 20. When this bit indicates no PDE index present, the page corresponding to the virtual address must be fetched from secondary storage. A page fault is registered on the line 120 and the condition code is set to 2. When a valid PDE index exists, the index entry from the hash table 22 is loaded into the primary directory entry (PDE) index register 23 and is used to select an entry in a primary directory 24, also located in main storage. This selected primary directory entry (SPDE) is loaded into the SPDE register 25. The page portion of the virtual address contained in the second operand register 17 is compared with the virtual address contained in the SPDE register 25 by a comparator 30. If they match, an output signal indicating that the primary directory entry exists is generated on the line 130 by the comparator 30. If they do not match, no output signal is generated and the CHAIN INDEX field in the SPDE register 25 is used to select another entry in the primary directory 24. This process continues until either a match is found or the end of the chain of primary directory entries is encountered, at which point the appropriate output level appears on the output line 130 of the comparator 30. Reaching the end of the chain with no match means that a primary directory entry containing the designated virtual address does not exist, and the output of the comparator is a logical 0. The output of the inverter 31 then is a logical 1 and is used to set the condition code to 2, indicating this situation, and execution of the instruction is completed.

If the proper primary directory entry exists, the comparator 30 detects a match and generates a logical 1 on the output line 130. In this case the Valid bit from the STATUS field of the primary directory entry contained in the SPDE register 25 is placed on the line 125 and is used to determine if incrementing or decrementing will be allowed. When the Valid bit is a logical 1, both inputs to the AND gate 33 are 1 and its output is a logical 1. This causes the condition code to be set to 0, indicating that the primary directory entry exists and is valid. In addition, a logical 1 input is provided on the line 133 to the FORCE +1 functional element 35 which forces a positive one into the left half of the arithmetic logic unit (ALU) 40, e.g. by gating a bit string ending in 1 and having the appropriate leading 0's to the ALU 40. This prepares the ALU 40 to increment or decrement the PINCNT field by one. When the Valid bit in the STATUS field is a logical 0, the output of the AND gate 33 is a logical 0, but, due to the inverter 32, the output of the AND gate 34 is a logical 1. This causes the condition code to be set to 1, indicating that the primary directory entry exists and is invalid.

Assuming the primary directory entry exists and is valid, the decision of whether or not to increment or decrement the PINCNT field depends on the setting of bits 12 and 13 in the $I_3$ field of the HVVA instruction. These bits from the instruction buffer 10 are transmitted on the lines 312 and 313, respectively, and are used by the inverter 51 and the AND gates 36 and 38 to determine if the ALU 40 is to increment or decrement the PINCNT field by the positive one forced into the left side of the ALU, or leave it unchanged. The output of the AND gates 36 and 38 is carried on the lines 136 and 138, respectively, to the subtract and add sections of the ALU 40. The PINCNT field from the SPDE register 25 is gated to the right side of the ALU 40, the appropriate operation is performed in ALU 40 and the result is stored back into the PINCNT field of the selected entry in primary directory 24. With bit 12 of the $I_3$ field equal to a logical 1 and bit 13 also equal to a logical 1, the output of AND gate 36 is a logical 1 and the PINCNT field is decremented. With bit 12 of the $I_3$ field equal to a logical 1 and bit 13 equal to a logical 0, the output of AND gate 38 is a logical 1 and the PINCNT field is incremented. If neither an add or a subtract operation is indicated by bits 12 and 13 of the $I_3$ field (i.e. bit 12 is 0) or if a plus 1 is not forced by the element 35, the ALU 40 performs a pass operation which leaves the PINCNT field unchanged. The overflow signal from the ALU 40 indicates that the PINCNT field was incremented beyond 255 or decremented below zero, and a machine check occurs.

The execution of the HVVA instruction is completed by placing the hash table entry index value and the PDE index value (if the primary directory entry exists) into the first operand register 16 and storing this full-word into main storage at the first operand location. As stated above, the hash table entry index value occupies bits 0-14 of the full-word, while bit 15 is 0 and bits 16-27 contain the primary directory index value. Bits 28-31 are also zero. If no primary directory entry was found, bits 16-31 are unchanged. The resulting condition code (as discussed above) is registered in the appropriate latches (not shown).

Figure 3:
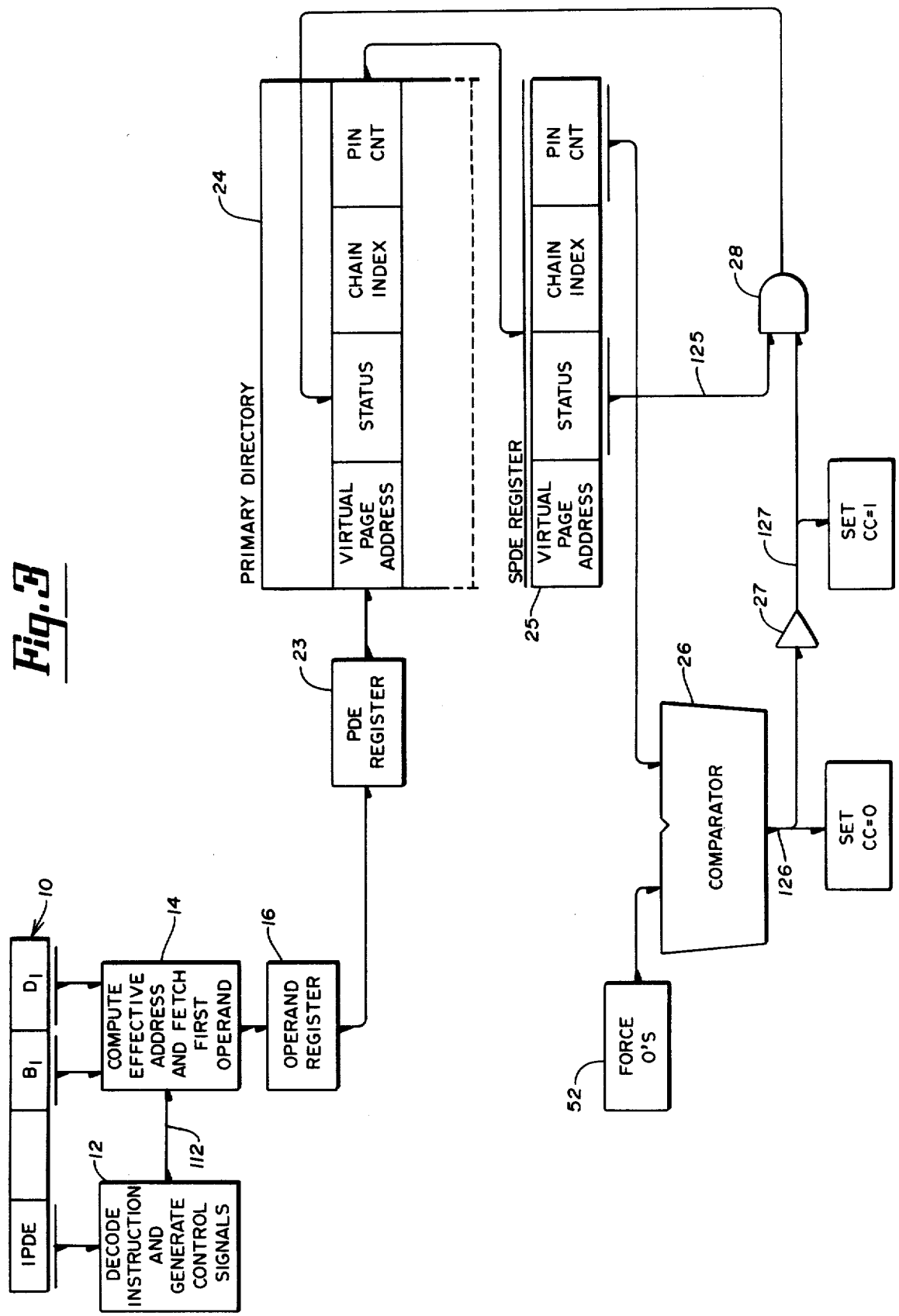
FIG. 3 is a function block and flow diagram showing execution of the IPDE instruction, implementing a part of the present invention.

An implementation of the IPDE instruction is shown in FIG. 3. Upon detecting that the instruction contained in instruction buffer 10 is an IPDE instruction, the instruction decoding hardware 12 next generates control signals, indicated symbolically by the line 112, which cause the operand to be fetched from main storage. This operation is shown schematically in block 14. The effective address for the operand is computed by adding the displacement $D_1$ from instruction buffer 10 to the contents of the base register identified by the $B_1$ field. This effective address is then used to fetch the operand from main storage into the first operand register 16. The first operand register 16 now contains the primary directory index value, which is loaded into the primary directory entry (PDE) index register 23 and is used to select an entry in the primary directory 24. The selected primary directory entry is loaded into the selected primary directory entry (SPDE) register 25. The contents of the PINCNT field of the entry in the SPDE register 25 is compared with an all-zero field, forced by any suitable means 52, in the comparator 26. The output of the comparator 26 on the line 126 indicates whether or not the PINCNT field is equal to zero. If this output is a logical 1 (compare equal), the condition code is set to 0. If this output is a logical 0 (compare not equal), the inverse of this output, from the inverter 27, on line 127, is used to set the condition code to 1. The output of the inverter 27 is also used along with the Valid bit (on the line 125) from the STATUS field of the contents of the SPDE register 25 by the AND gate 28 to determine the new setting of the Valid bit. If the PINCNT field is equal to zero, the output of the inverter 27 on the line 127 is a logical 0 and the Valid bit in the primary directory entry tested will be forced to zero by the AND gate 28. If the PINCNT field is not zero, the inverted output of the comparator 26 on the line 127 is a logical 1 and the output of the AND gate 28 is the same as the Valid bit contained in the SPDE register 25. The execution of the IPDE instruction is completed by storing the output of the AND gate 28 into the Valid bit position of the STATUS field of the selected entry, in primary directory 24. The resulting condition code (as discussed above) is registered in the appropriate latches.

Figure 4:
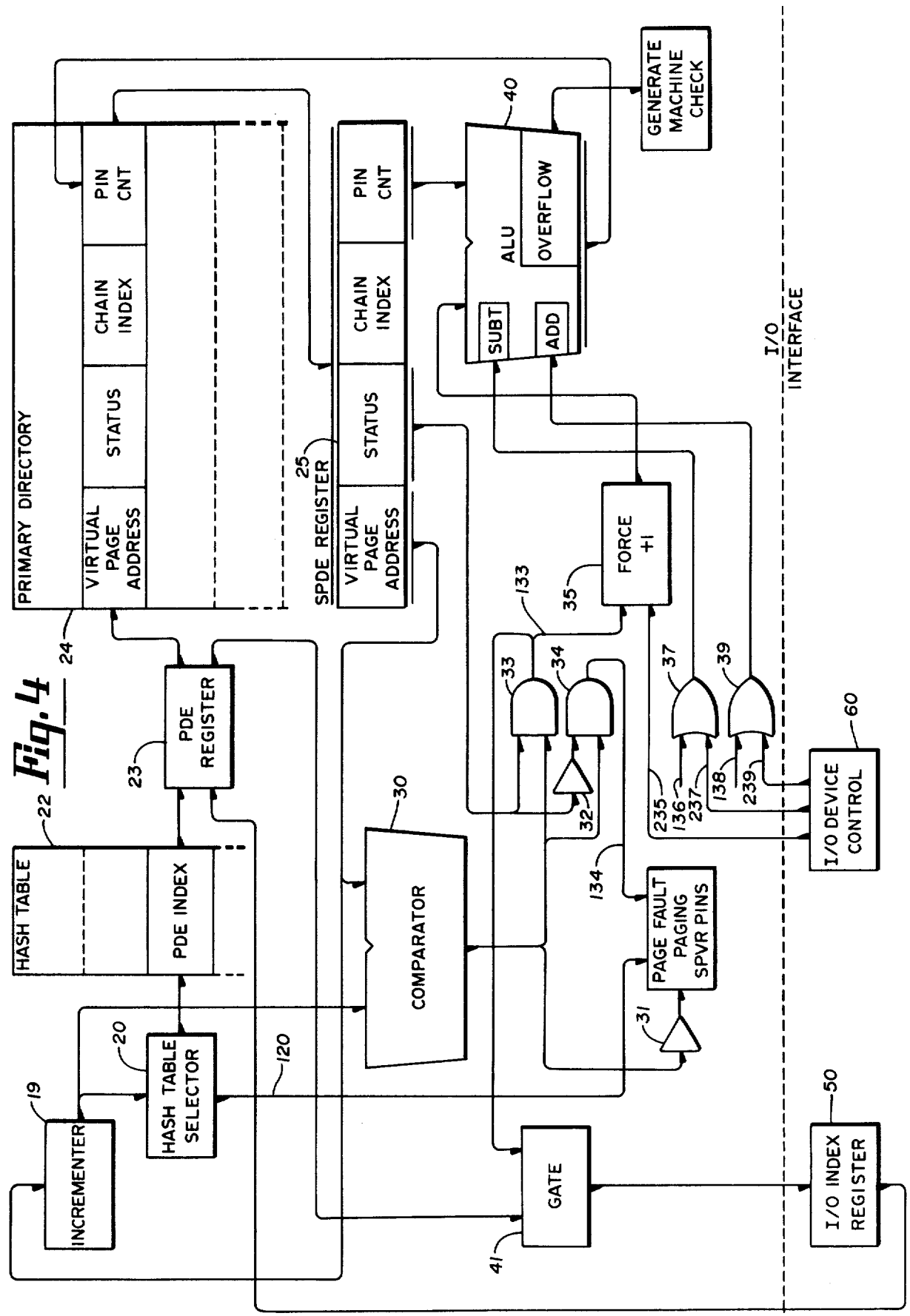
FIG. 4 is a function block and flow diagram showing the process and apparatus for pinning and unpinning pages by the I/O devices.

The logical circuit and schematic diagram of FIG. 4 illustrates how the I/O devices use a portion of the mechanism just described with respect to the HVVA and IPDE instructions to pin pages for data buffers in main storage. Such pages are pinned by the I/O devices as they are needed and unpinned when no longer needed. FIG. 4 has much the same data flow as shown in FIG. 2 with the addition of an incrementer 19, the OR gates 37 and 39, the control gate 41, the I/O index register 50 and the I/O device control, indicated by the block 60. Accordingly, a substantial portion of the functional logic shown in FIGS. 2 and 4 is in common, including the hash table selector 20, the hash table 22, the PDE register 23, the primary directory 24, the SPDE register 25, the comparator 30, the AND gates 33 and 34, the FORCE +1 element 35, and the ALU 40.

Operation of the additional elements, in combination with the common functional logic implementing the HVVA and IPDE instructions, to permit dynamic page pinning by I/O devices is as follows. When an I/O device performs a given data transfer, the contents of the I/O index register 50 is an index pointer to the primary directory entry for the page from which data is fetched or to which data is stored. When a new page must be obtained for a data transfer, the pointer in the I/O device register must be updated. Accordingly, means must be provided to recognize an I/O page crossing, at which time a new page will be required. One way in which a page crossing can be detected is as follows. After each data transfer a page crossing counter (not shown) is incremented (or, in some cases, depending on the particular I/O device, decremented) to reflect the byte address of the next sequential memory location from which data is to be fetched or in which data is to be stored. Depending on the number of bytes in a page, certain bits in the byte address in the page crossing counter indicate that a page boundary has been reached. When this occurs, it is detected by testing the appropriate bits, and the I/O device is now ready to give up, by unpinning, the page it has exhausted, and to acquire, by pinning, its next buffer page. For some slower devices it may be sufficient to pin one new page while releasing the exhausted page. For faster devices and longer transfers it may be necessary to pin several pages ahead, with a new page being added to the set of reversed, pinned pages, each time a page is exhausted. In either case the mechanism is essentially the same, although when several pages ahead are pinned, it will be necessary to have several I/O index registers such as the register 50, to hold pointers to the primary directory entries of reserved, pinned pages between the exhausted page and the newly pinned page.

After a data buffer page crossing has been detected by the I/O device, the contents of the I/O index register 50 are transferred to the primary directory entry register 23 which is used to fetch a primary directory entry into the SPDE register 25 from the primary directory 24. The entry fetched is the entry for the exhausted pipe because the I/O index register 50 has not yet been updated. The virtual memory page address field in the SPDE register 25 is then gated to the incrementer 19. At the same time that the virtual page address from the SPDE register 25 is being incremented via the incrementer 19, the PINCNT field in the SPDE register 25 is gated to the ALU 40, decremented by 1, and stored back into the primary directory entry for the exhausted page. The signals to the ALU 40 to subtract 1 from the PINCNT field are supplied by an I/O device control line 235 via the FORCE +1 functional element 35 and by the line 237 via the OR gate 37. Both lines are activated by the I/O device control 60. (The other input to the OR gate 37 is the line 136 carrying the output of the AND gate 36 (FIG. 2), using in executing the HVVA instruction and not active during this sequence.) This operation decrements the PINCNT field for the exhausted I/O buffer page. That is, it releases the pin placed by the I/O device, but will not, of course, affect other pins on that page.

The real address of the next I/O buffer page is obtained by using the incremented virtual page address from the incrementer 19 as input to the hash table selector 20 to generate a hash table index. This index selects an entry in the hash table 22. In the event the selected hash table entry contains no PDE index, a page fault is registered on the line 120 and the paging supervisor takes over responsibility for fetching and pinning the page. If, on the other hand, the hash table entry contains a PDE index, this primary directory index is loaded into the PDE register 23 where it is used to fetch the primary directory entry for the next buffer page. At the same time, the contents of the PDE register 23, containing a PDE index to the new buffer page, are transferred via the control gate 41 to the I/O index register 50. The use of the output of the AND gate 33, as the other, conditioning input to the gate 41, insures that the contents of the PDE register 23 are not gated to the I/O index register 50 until and unless it is found that a primary directory entry exists and is valid. The logic for the output of the AND gate 33 is described in detail above with reference to the HVVA instruction and condition code 0.

In short, the AND gate 33 will produce the triggering output for the gate 41 only when the comparator 30 has located a matching virtual page address and a Valid bit of logical 1 has been gated to AND gate 33 from the STATUS field of the contents of SPDE register 25. The gate 41 may be implemented in a variety of ways. For example, it may be a register having the same contents as the PDE register 23, the output of which is transmitted to the I/O index register 50 when triggered by a logical 1 on the output of the AND gate 33. Alternatively, the gate 41 may resemble a sequence of AND gates, each one of which has as one input the output of the AND gate 33 and as the other input one of the bits of the PDE register 23. Another possibility is that the gate 41 is implemented as a means for reading into the I/O index register 50 a new set of bits taken from the PDE register 23.

The PINCNT field in the primary directory entry for the next buffer page, which is now contained in the SPDE register 25, is gated to the right half of the ALU 40, is incremented in the ALU 40 and stored back into the appropriate primary directory entry. If the ALU increments the PINCNT field beyond 255, overflow results and a machine check occurs. The signals to add 1 to the PINCNT field are supplied by the line 235 via the FORCE +1 element 35 and the line 239 via OR gate 39. Both are activated by the I/O control device 60. (The other input to the OR gate 39 is the line 138 carrying the output of the AND gate 38 (FIG. 2) used in executing the HVVA instruction and not active during this sequence.)

The PINCNT field is not incremented unless and until the primary directory entry is found valid and the virtual page addresses in the SPDE register 25 and in the incrementer 19 agree. If the end of the primary directory entry chain is reached without finding a match between the address in the incrementer 19 and any primary directory entry in the chain, then a page fault is registered and the paging supervisor takes over responsibility for fetching and pinning the page. Similarly, if a primary directory entry is found but the Valid bit in the STATUS field is off, the paging supervisor also must take over responsibility. The logic for detecting these two contingencies is established by the inverter 31, which outputs a logical 1, signaling a page fault, when the comparator 30 finds no match, and by the inverter 32, in combination with the AND gate 34, which together signal a logical 1 on the line 134 when the comparator 30 finds a match (i.e., the primary directory entry for the page exists) but the Valid bit of the STATUS field of the primary directory entry (input to the inverter 32) shows that the page is invalid. These two cases are analogous to the situations resulting in setting the condition code to 1 or 2 following execution of the HVVA instruction.

From the foregoing it is seen that the invention provides a synchronizing apparatus for page replacement control where either the CPU or the I/O devices may pin or unpin pages to control their replacement by the paging supervisor. It is further seen that the synchronizing apparatus permits pinning and unpinning by the I/O devices to occur wholly independently of these operations as performed by the CPU. These objectives are achieved by means of a common virtual address translation mechanism, including a primary page directory having entries for each page in main storage.

While the preferred embodiment of the invention has been illustrated and described, it is to be understood that the invention is not limited to the precise construction herein disclosed, and the right is reserved to all changes and modifications coming within the scope of the invention as defined in the appended claims.

Having thus described the invention, what is claimed as new, and desired to be secured by Letters Patent is:

1. In a computer system employing paged virtual memory and having main storage, a central processing unit (CPU), and input-output (I/O) devices connected to the main storage and the central processing unit, the improvement comprising:
   virtual memory address translation means common to said CPU and said I/O devices for translating virtual memory addresses received from the CPU and the I/O devices into addresses of locations in main storage, said translation means including a page directory common to said CPU and said I/O devices and having entries corresponding to pages in main storage, in which said entry contains a page pin field for indicating page usage;
   synchronizing means operable under the control of either the CPU or the I/O devices for accessing said common page directory and for setting the page pin fields in the entries of the page directory to indicate page usage by the CPU and/or the I/O devices; and
   means under the control of the CPU for testing the page pin fields for indicating page usage to determine whether a given page is in use by either the CPU or the I/O devices and for invalidating further references to that page when it is found not to be in use, without surrendering control between the testing and invalidating operations.

2. The system as recited in claim 1 wherein the field page pin for indicating page usage comprises a field in which a page usage count is kept.

3. The system as recited in claim 2 wherein the means for setting the page pin fields for indicating page usage further comprises means for incrementing and decrementing the page usage count.

4. The system as recited in claim 1 wherein the page directory entries corresponding to pages in main storage further contain a field for indicating that references to a page corresponding to a given page directory entry are invalid.

5. The system as recited in claim 4, further comprising means for testing the fields for indicating that references to a page corresponding to a given page directory entry are invalid and for preventing any setting of the page pin fields for indicating page usage while the field for indicating that references to a page are invalid indicates that such references are invalid.

6. The system as recited in claim 1 wherein the synchronizing means operable under the control of either the CPU or the I/O devices for setting the page pin fields for indicating page usage comprises means for indicating termination of usage of one page by one of said I/O devices and immediately thereafter indicating commencement of usage of another page referred to by said one I/O device.

7. The system as recited in claim 6 wherein said synchronizing means operable under the control of either the CPU or the I/O devices for setting the page pin fields for indicating page usage further comprises an index register, the contents of which is an index value pointing to an entry in the page directory corresponding to a page being used by an I/O device associated with the index register.

8. The system as recited in claim 7 further comprising means for updating the contents of the index register following termination of usage of one page by one of said I/O devices and commencement of usage of another page referred to by said one I/O device.

9. The system as recited in claim 1 wherein said page directory comprises a plurality of locations in main storage, each location being associated with a particular page in main storage.

10. The system as recited in claim 1 wherein the virtual memory address translation means further comprises:
    a hash table, the entries of which are pointers to entries in the page directory;
    hashing means for producing a pointer into the hash table by hashing the page portion of a virtual memory address; and
    means operable under the control of the CPU and the I/O devices for providing the page portions of virtual memory addresses as input to the hashing means.

11. The system as recited in claim 1 wherein the CPU has means for executing an IPDE instruction, which instruction causes the page pin field for a specified page directory entry to be tested to determine page usage and causes an indication to be registered in said page directory entry that further references to the page corresponding to the page directory entry are invalid when it is determined that there is no current page usage, said instruction having as a format:

a first, operation code field for specifying that the instruction is an IPDE instruction, and a second field for specifying an index identifying the specified page directory entry, the page pin field of which is to be tested, said means for executing the IPDE instruction comprising means for decoding the first, operation code field of the IPDE instruction and for issuing control signals specified by the information in said first and second fields to said synchronizing means, and wherein said synchronizing means comprises:

means responsive to said control signals for locating the specified page directory entry and for testing the page pin field of said entry to determine page usage, and means responsive to an indication of no current page usage in the page pin field of said entry for causing an indication to be registered in the specified page directory entry that further references to the page corresponding to the specified page directory entry are invalid.

12. The system as recited in claim 1 wherein the CPU has means for executing an HVVA instruction, which instruction causes a specified virtual memory address to be vertified for validity and specifies whether the page pin field corresponding to the specified virtual memory address is to be set, said instruction having as a format;

a first, operation code field for specifying that the instruction is an HVVA instruction, a second field for specifying the memory location of the specified virtual address to be verified, a third field for specifying the memory location for storage of hash index and page directory index values identifying the page directory entry for the main storage location of the specified virtual memory address, and a fourth field for specifying whether the page pin field of the primary directory entry associated with the specified memory address is to be set and, if it is to be set, specifying whether it is to be incremented or decremented, said means for executing the HVVA instruction comprising means for decoding the first, operation code field of the HVVA instruction and for issuing control signals specified by said first, second, third and fourth fields to said virtual memory address translation means and said synchronizing means, said virtual memory address translation means comprising:

a hash table, the entries of which are pointers to entries in the page directory, hashing means responsive to said control signals for producing a pointer into the hash table by hashing the page portion of a virtual memory address, means responsive to said hashing means and the pointer into the hash table for producing a page directory index corresponding to said pointer and for locating, in turn, the page directory entry corresponding to said specified memory address or determining that no corresponding page directory entry exists, and means responsive to said control signals and to the existence of a corresponding page directory entry for communicating to the CPU for storage at the address specified in said third field the pointer into the hash table and the page directory index corresponding to said specified memory address, said synchronizing means comprising:

means responsive to said control signals and to the existence of a corresponding page directory entry for determining whether the page pin field for said specified memory address is to be set, for determining whether said page pin field is to be incremented or decremented, if it is to be set, and for incrementing or decrementing said page pin field in accordance with these determinations.

13. The system as recited in claim 1 wherein said page directory entries include a virtual page address field specifying the virtual page currently occupying the corresponding main storage page, wherein said synchronizing means comprises an index register, the contents of which is an index value pointing to an entry in the page directory corresponding to a page being used by an I/O device associated with the index register, and wherein the I/O device has control means for controlling the setting of page pin fields in the entries of the page directory upon the occurrence of an I/O page crossing, said control means comprising:

means communicating with said synchronizing means for locating the page directory entry corresponding to the contents of said index register at the time the page crossing occurs;

means communicating with said synchronizing means for modifying the page pin field of the page directory entry corresponding to the contents of said index register at the time the page crossing occurs;

means communicating with said synchronizing means for generating a modified virtual page address corresponding to the next virtual page address to be used by the I/O device;

means communicating with said virtual address translation means for locating a new page directory entry corresponding to the modified virtual page address and for specifying its associated new page directory index, said means generating a page fault signal when the modified virtual page address specifies a virtual page for which no page directory entry currently exists;

means communicating with said synchronizing means for modifying the page pin field of the new page directory entry corresponding to the modified virtual page address; and means communicating with said virtual address translation means and said synchronizing means for communicating the new page directory index to the index register.

* * * * *

UNITED STATES PATENT AND TRADEMARK OFFICE
CERTIFICATE OF CORRECTION

PATENT NO. : 4,277,826
DATED : July 7, 1981
INVENTOR(S) : Collins, et al.

It is certified that error appears in the above—identified patent and that said Letters Patent is hereby corrected as shown below:

On the cover page, following the inventors' names and preceding "Appl. No.: 954,034" the following assignment data should appear:

--Assignee: International Business Machines Corporation, Armonk, N.Y.--

Signed and Sealed this

Thirteenth Day of October 1981

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,277,826
DATED : July 7, 1981
INVENTOR(S) : Robert W. Collins et al.

It is certified that error appears in the above—identified patent and that said Letters Patent is hereby corrected as shown below:

Column 1, line 56, "or" should be -- of --
Column 9, line 50, "reversed" should be -- reserved --
Column 9, line 62, "pipe" should be -- page --
Column 10, line 9, "using" should be -- used --
Column 11, line 56, "said" should be -- each --
Column 12, line 3, "field" shold be omitted.
Column 12, line 4, after "pin" should be -- field --
Column 12, line 60, "the" should be - said --

Signed and Sealed this

Sixteenth Day of February 1982

[SEAL]

Attest:

GERALD J. MOSSINGHOFF

Attesting Officer   Commissioner of Patents and Trademarks